United States Patent [19]

McNerney et al.

[11] Patent Number: 6,038,293
[45] Date of Patent: Mar. 14, 2000

[54] METHOD AND SYSTEM FOR EFFICIENTLY TRANSFERRING TELEPHONE CALLS

[75] Inventors: Shaun McNerney; William Rusty Cullers, both of Colorado Springs, Colo.

[73] Assignee: MCI Communications Corporation, Washington, D.C.

[21] Appl. No.: 08/922,369

[22] Filed: Sep. 3, 1997

[51] Int. Cl.[7] .................................................. H04M 3/58

[52] U.S. Cl. .................. 379/88.19; 379/88.2; 379/88.16; 379/201

[58] Field of Search .............................. 379/88.16, 88.17, 379/88.19, 88.2, 88.21, 201, 210, 212, 265, 266

[56] References Cited

U.S. PATENT DOCUMENTS

| | | | |
|---|---|---|---|
| 5,179,585 | 1/1993 | MacMillan, Jr. et al. | 379/212 |
| 5,479,487 | 12/1995 | Hammond | 379/212 |
| 5,555,299 | 9/1996 | Maloney et al. | 379/212 |
| 5,796,812 | 8/1998 | Hanlon et al. | 379/212 |
| 5,854,837 | 12/1998 | Trader et al. | 379/265 |

*Primary Examiner*—Daniel S. Hunter

[57] ABSTRACT

A computer implemented method responds to a telephone call from a caller. In response to receiving the telephone call, a first call receiving device obtains call information for the caller. The first call receiving device transfers the telephone call and transmits the call information to a second call receiving device. A call recognition service may be employed as a central repository for the call information and as an interface between the call receiving devices. Transmitting the call information to the second call receiving device enables the second call receiving device to service the caller without having to reobtain the call information for the caller.

9 Claims, 2 Drawing Sheets

METHOD AND SYSTEM FOR EFFICIENTLY TRANSFERRING TELEPHONE CALLS

TECHNICAL FIELD

The present invention relates to telephony, and more particularly, to transmitting call information between call receiving devices if a telephone call is transferred between the call receiving devices.

BACKGROUND OF THE INVENTION

Call centers and interactive voice response (IVR) units are widely used in many industries for providing various services for customers over the telephone. A typical call center includes a number of agents who field inbound telephone calls and/or place outbound telephone calls. Each agent has an associated station that includes a personal computer or workstation and a telephone. The agent may field inbound calls, such as 800 number calls, from potential or current customers seeking service over the telephone. An IVR unit is a computer that uses a digitized human voice to provide information to and/or obtain information from a caller. For example, when a caller calls an airlines company for flight information, an IVR unit typically responds by giving the caller one or more menus of information options, such as flight departure and flight arrival information, and then provides the desired information when the caller selects the desired option by pushing one of the telephone keys.

With the proliferation of call centers and IVR units, telephone calls are more frequently transferred between call centers and IVR units. A caller may reach an IVR unit and input information regarding the services or information desired by the caller. The IVR unit may then determine that the caller needs to be serviced by a particular call center and will transfer the caller to that call center. For example, the caller calling an airlines company may desire to speak to a reservations agent to obtain a flight reservation and to the frequent flyer department to determine whether the caller has sufficient frequent flyer miles to receive a free flight. The IVR may forward the call to the call center for reservations, and after making the flight reservation, the reservations agent may forward the caller from the reservations call center to the frequent flyer call center.

When a caller is transferred, the caller typically must repeat information. The need to repeat information can occur for transfers between an IVR unit and a call center agent, from one call center agent to another, and from one call center to another. Requiring the caller to repeat previously provided information, the duration of the call is longer and call charges are greater. In addition, the caller is inconvenienced, which may produce or increase customer dissatisfaction. Moreover, the chances for error are greater because the same information is collected multiple times.

SUMMARY OF THE INVENTION

An embodiment of the invention is directed to a method and system for responding to a telephone call from a caller. In response to receiving the telephone call, a first call receiving device obtains call information for the caller. The first call receiving device transfers the telephone call and transmits the call information to the second call receiving device. Transmitting the call information to the second call receiving device that receives the transferred telephone call enables the second call receiving device to service the caller without having to repeat the step of obtaining the call information for the caller.

The call information may be sent from the first call receiving device to the second call receiving device via a call recognition service. In one embodiment, the first call receiving device sends the call information to the call recognition service which stores the call information. In response to receiving the telephone call from the first call receiving device, the second call receiving device transmits to the call recognition service a request for any call information associated with the telephone call. In response, the call recognition service accesses the stored call information and transmits the call information to the second call receiving device.

In an alternate embodiment, the call information is stored on the first call receiving device rather than the call recognition service. Upon transferring the telephone call to the second call receiving device, the first call receiving device transmits to the call recognition service a pointer that references the location in the first call receiving device at which the call information is stored. In response to receiving the request for call information from the second call receiving device, the call recognition service uses the pointer to access the call information stored in the first call receiving device. A call recognition service receives the call information from the first call receiving device and forwards the information to the second call receiving device.

DETAILED DESCRIPTION OF THE INVENTION

A telecommunications network, and in particular, a method and system for providing call information when forwarding telephone calls in the network, is described in detail herein. In the following description, numerous specific details are set forth, such as rules for handling telephone calls, ordering and execution of steps, etc., in order to provide a thorough understanding of the present invention. One skilled in the art, however, will readily recognize that the present invention can be practiced without use of the specific details described herein, or with other specific steps or options for forwarding telephone calls, etc. Well-known structures and steps are not shown or described in detail in order to avoid obscuring the present invention.

Figure 1:
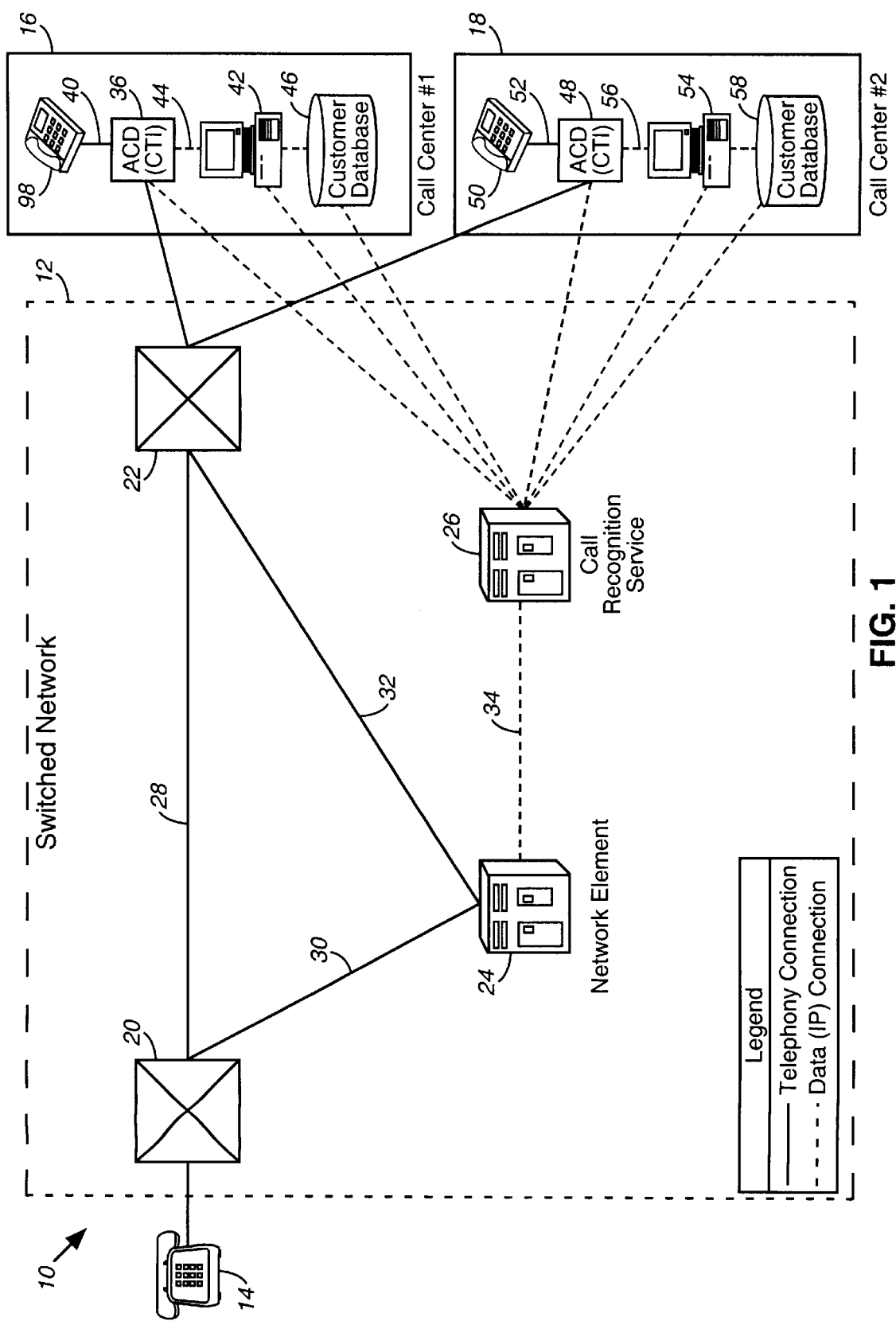
FIG. 1 is a schematic diagram of a telecommunications system for transferring call information and telephone calls according to an embodiment of the present invention.

A telecommunications system 10 that provides call information when a telephone call is transferred according to an embodiment of the present invention is shown in FIG. 1. The telecommunications system 10 includes a public switched telephone network (PSTN) 12 connected to a caller telephone 14 and first and second call centers 16, 18. The PSTN 12 includes telephone switches 20, 22, a network element 24, and a call recognition service (CRS) 26. The first telephone switch 20 is connected to the second telephone switch 22 and the network element 24 by first and second telephony connections 28, 30, respectively, and the second telephone switch 22 is connected to the network element 24 by a third telephony connection 32. The telephony connections 28–32 are connections that allow voice communication and may include voice-grade trunks and intervening switches of the PSTN 12. The network element 24 is coupled to the CRS 26 by a data connection 34. The data connection 34 may be made using any elements capable of transmitting data such as a dedicated wire of a local area network (LAN) or a voice-grade trunk obtained using modems in the network element 24 and the CRS 26.

The network element 24 can be any device that processes telephone calls and can collect call information from a caller that initiates a telephone call. A common example is an interactive voice response platform (IVR), also known as a voice response unit (VRU) or an audio response unit (ARU). Examples of such IVR platforms include enhanced voice services (EVS) and next generation service node (NGSN) produced by MCI Telecommunications Corporation, the assignee of the present invention. An IVR platform provides a menu of options for a caller, and solicits caller input via voice or dual tone multi-frequency (DTMF) signals.

The network element 24 could be implemented using an IVR platform or various other types of network elements to collect information from a caller and provide processing of telephone calls. With the advent of internet telephony, new types of such network elements are being developed. The following discussion refers to the network element 24 being an IVR platform for exemplary purposes, but it will be understood that the present invention can be implemented using numerous types of network elements.

The IVR 24 may include a processor, memory, and an audio server that accepts voice/fax calls on a telephony port, records, stores and plays recorded audio messages and menus for a caller, prompts a caller for input (voice, flash-hooks, DTMF digits, etc.), and collects caller input. The IVR 24 also may include an automated call processor, typically a computer, that performs intelligent processing of calls. For example, the automated call processor may forward telephone calls to other call receiving devices, such as the call centers 16, 18, based on input received from callers.

The first call center 16 includes an automatic call distributor (ACD) 36 coupled to the second telephone switch 22 of the PSTN 12. The ACD 36 is coupled to an agent telephone 38 by a voice line 40 and to an agent workstation 42 by a data line 44. The ACD 36 includes a computer/telephony interface (CTI) that enables the ACD 36 to transmit data to and receive data from the agent workstation 42. The ACD 36 typically would be coupled to plural agent telephones and workstations, but for simplicity, only the single agent telephone 38 and agent workstation 42 are shown. The ACD 36 automatically distributes incoming calls from the PSTN 12 to one of the agent telephones, such as the agent telephone 38, depending on which of the agent telephones are currently being used. The first call center 16 also includes a customer database 46 that is accessible by the agent workstation 42.

Like the first call center 16, the second call center 18 includes an ACD 48 coupled to an agent telephone 50 by a voice line 52 and coupled to an agent workstation 54 by a data line 56. The second call center 18 also includes a customer database 58 stored in a storage device that is accessible by the agent workstation 54. The elements 50–58 of the second call center 18 operate substantially identically to the corresponding elements 38–46 of the first call center 16.

The CRS 26 may be implemented on a standard computer server that is connected to various components of the first and second call centers 16, 18. In particular, the CRS 26 may be connected to the ACDs 36, 48; agent workstations 42, 54; and customer databases 46, 58 by data connections to enable the CRS 26 to transfer data to and receive data from the various components of the call centers 16, 18. As such, the CRS 26 is part of a data network that includes the network element 24 and the components of the call centers 16, 18, other than the agent telephones 38, 50. The CRS 26 does not require any voice links to the telephone switches 20, 22 or the network element 24. The data connections between the CRS 26 and the call centers 16, 18 can be implemented using transmission control protocol/internet protocol (TCP/IP), or other standard communications technology.

The CRS 26 acts as a centralized repository for call information collected on a telephone call. The CRS 26 provides for the centralized storage of, access to, and/or linking to the call information collected by various call receiving devices, such as the network element 24 and the call centers 16, 18. When a telephone call is transferred from a first call receiving device to a second call receiving device, the CRS 26 can provide to the second call receiving device the call information collected by the first call receiving device and any previous call receiving devices that collected call information from the caller. Transmitting the call information to the second call receiving device enables the second call receiving device to service the caller without having to repeat the step of obtaining the call information from the caller.

A caller may place a telephone call from the caller telephone 14 to the network element 24 via the first telephone switch 20. The network element 24 obtains call information that may include information regarding the caller, including the caller's spoken name, and information regarding the services requested by the caller. The call information may be obtained by querying the caller or can be collected automatically from the first telephone switch 20 such as an automatic number identification (ANI) or dialed number information service DNIS. The network element 24 sends the call information obtained to the CRS 26 for storage. In addition, the network element 24 directs the telephone call to the appropriate one of the call centers 16, 18 via the second telephone switch 22 based on the services requested by the caller.

The CRS 26 stores the call information received from the network element 24. Because the network element 24 automatically sends the call information to the CRS 26, the CRS does not have to query the network element 24 for the call information for each telephone call received by the network element 24. In addition, the call information may be stored on the CRS 26. This would eliminate the need for the network element 24 to store the call information after the network element 24 has transferred the telephone call to one of the call centers 16, 18.

If the telephone call is transferred to the first call center 16, then the ACD 36 forwards the telephone call to one of the agent telephones in the first call center, such as the agent telephone 38. The agent workstation 42 associated with the agent telephone 38 obtains the call information from the CRS 26. In one embodiment, the ACD 36 automatically queries the CRS 26 for the call information obtained for each telephone call received by the ACD 36. In response to receiving the requested call information from the CRS 26, the ACD 36 automatically forwards the call information to the agent workstation associated with the agent telephone to which the ACD 36 is directing the telephone call. In an alternate embodiment, an agent receiving a telephone call can use his/her workstation to request, from the CRS 26, call information collected for the telephone call.

The caller may also initiate a telephone call from the caller telephone 14 directly to one of the call centers 16, 18 using the PSTN 12 without using the network element 24.

For example, if the telephone call is initiated with the first call center 16, the ACD 36 will receive the telephone call and forward it to one of the agent telephones of the first call center 16, such as the agent telephone 38. The agent using the agent telephone 38 will obtain call information from the caller and input the call information to the customer database 46 using the agent workstation 42. If desired by the caller, the agent can transfer the telephone call to the second call center 18 via the ACD 36 and the second telephone switch 22.

The CRS 26 enables the agent in the first call center 16 to transfer the call information obtained for the current telephone call to the second call center 18 before, during or shortly after transmitting a telephone call to the second call center 18. In one embodiment, the agent workstation 42 stores the call information in the customer database 46 of the first call center 16 and transmits to the CRS 26 a pointer that references the call information stored in the customer database 46. The call center agent that receives the telephone call in the second call center 18 queries the CRS 26 for the call information collected for the telephone call. The CRS 26 uses a pointer received from the first call center 16 to retrieve the call information that is stored in the customer database 46 of the first call center 16. Depending on the physical arrangement of the first call center 16, the CRS 26 can either access the call information in the customer database 46 directly or via the agent workstation 42. After retrieving the call information from the customer database 46 of the first call center 16, the CRS 26 forwards the caller information to the agent workstation 54 associated with the agent telephone 50 that received the telephone call forwarded by the first call center 16. As such, the CRS serves as a selective link between agent workstations at one call center and customer databases at another call center.

In a second embodiment, the agent workstation 42 forwards the call information to the CRS 26 rather than storing the call information in the customer database 46. The CRS 26 stores the call information rather than a pointer to call information stored in the customer database 46. In response to receiving a request for the call information from the agent workstation 54 of the second call center 18, the CRS 26 accesses the call information stored in the CRS 26 and forwards the call information to the agent workstation 54 of the second call center 18.

When a telephone call is transferred between call receiving devices, such as the network element 24 and the call centers 16, 18, the call receiving device that receives the transferred telephone call needs to query the CRS 26 for the previously collected call information. To enable the CRS 26 to identify the call information associated with the telephone call, a call identifier is assigned to the telephone call. Although several methods of identifying the telephone call are available, the preferred embodiment uses the ANI that is transferred between call receiving devices along with the telephone call.

The CRS 26 receives the ANI with the call information or call information pointer received from a call receiving device that is transferring the telephone call. The CRS stores the call information or call information pointer in a manner that enables the call information or call information pointer to be accessed using the associated ANI. For example, the CRS 26 may use the ANI as a key to a record in a CRS database that contains the call information or call information pointer. When receiving a telephone call, a call receiving device also receives the ANI for the telephone call. The call receiving device transmits the ANI to the CRS 26 which responds by using the ANI to access the call information associated with the telephone call that was transferred with the ANI.

It should be appreciated that other call identifiers can be used to associate call information with a telephone call. It is common for businesses to have a single ANI with multiple lines, thus allowing multiple simultaneous telephone calls to be made with a single ANI. To create separate call identifiers for each of the multiple lines, an extension of one or more digits can be added to the ANI. Alternatively, the call identifier simply may be a generated number unrelated to the ANI. If the CRS 26 is used in an Internet application, the Internet protocol (IP) address or other scheme can be employed.

After a telephone call has been completed, the call information stored in the CRS 26 or one of the customer databases 46, 58 of the call centers 16, 18 may be discarded. The ACD of the call center that terminates the telephone call can transmit to the CRS 26 an indication that the call has been completed and the call information can be discarded. Alternatively, the CRS 26 can be programmed to retain the call information for a specified time if the CRS data storage resources are sufficient. The call information for a completed telephone call could be reaccessed in the event that the caller initiates a new telephone call to the same call centers. In addition, the retained call information could be used for billing, marketing, and statistical analysis of telephone calls.

Figure 2:
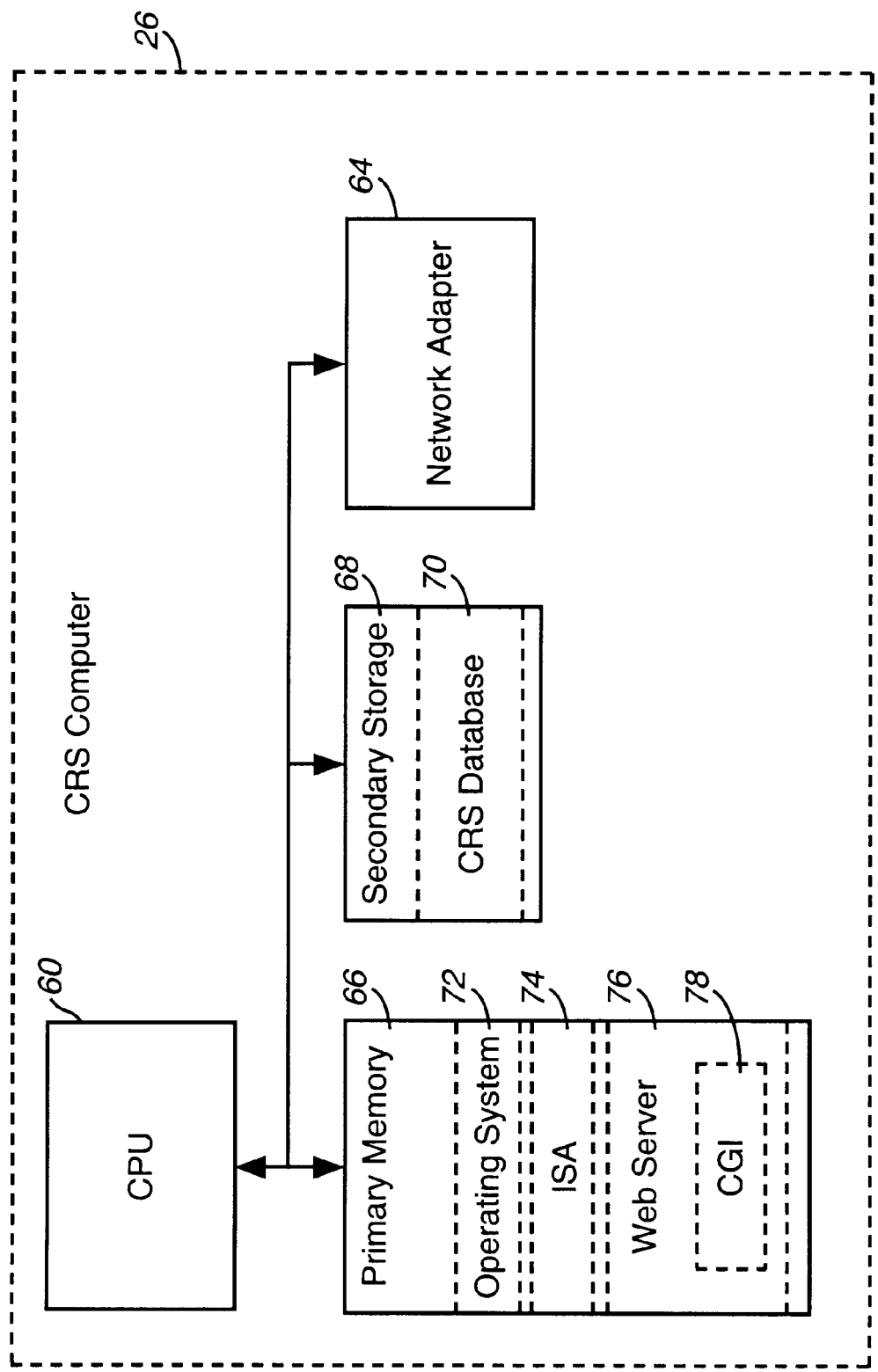
FIG. 2 is a block diagram of a call recognition service computer of the telecommunications system shown in FIG. 1.

A block diagram of one embodiment of the CRS 26 is shown in FIG. 2. In the embodiment shown in FIG. 2, the CRS is implemented using a single computer although plural computers could be employed. The CRS 26 includes a central processing unit (CPU) 60 for overseeing operation of the CRS 26. The CRS 26 may also include a network adapter 64 that enables the CRS 26 to be connected to one of the call receiving devices 16, 18, 24 in a local area network (LAN), wide area network (WAN), or intranet. For example, the CRS 26 can be part of a local area network that includes the network element 24 such that the data connection 34 between the network element 24 and the CRS 26 is a network data line. It will be appreciated that there are many ways to communicate data between the call centers 16, 18, network element 24 and CRS 26, such as via modems.

The CRS 26 also includes a primary memory 66 and a secondary storage 68. The secondary storage 68 includes a CRS database 70 in which the call information and call information pointers associated with various telephone call are stored. The primary memory 66 may hold a number of different types of data and programs. These programs may include an operating system 72, an interactive service agent (ISA) 74, and a web server 76. As is well known, the operating system 72 manages the basic operations of the CRS computer, and provides an interface between the application programs 74, 76 and the hardware devices 62, 64, 68 of the CRS 26. The ISA 74 is a program or set of programs that acts as the main interface to the CRS database 70. The ISA can retrieve requested call information or call information pointers from the CRS database 70 or from external sources such as the customer databases 46, 58 of the call centers 16, 18. The ISA 74 can access data on nearly any type of system, including mainframe databases (e.g., DB 2 Adabas) server databases (e.g., Sybase, Oracle, Informix), terminal screens, Internet web pages, etc. The ISA 74 can provide data via a number of methods including web pages, e-mail messages, fax messages, and terminal displays. One program that can be used as the ISA 74 is Electronic Workforce by Edify Corporation.

The web server 76 provides a communications interface between the CRS 26 and the call receiving devices, such as the network element 24 at the call centers 16, 18. The web server 76 includes a common gateway interface (CGI) 78 that enables the web server to communicate with the call receiving devices using one or more communication protocols, such as the conventional TCP/IP protocol suite. As is well-known, a CGI, such as the CGI 78, is a program or set of programs that provide an interface between a web server, such as the web server 76, and web browsers that access information from the web server. The web server can collect call information from the call receiving devices 16, 18, 24 and pass the call information to the ISA 74 for storage in the CRS database 70. In response to receiving requests for the call information, the web server 76 forwards the request to the ISA 74 which retrieves the caller information from the CRS database 70. The ISA 74 may format the call information into a hyper-text mark-up language (HTML) web page and causes the web server 76 to transmit the web page through the agent workstation that requested the call information.

The telecommunications network 10 including the CRS 26, can be used to forward call information for a variety of different call flows. Two examples are described below although many other examples are possible and will be recognized by persons skilled in the art.

Call Flow 1

A caller calls a 1-800 number that places the telephone call to the network element 24.

The network element 24 obtains the ANI of the telephone call.

The network element 24 collects other call information from the caller such as a particular service request (e.g., billing problem). The call information is collected from the caller via DTMF signals produced by the caller pressing appropriate keys on the caller telephone 14 in response to a menu of options provided to the caller by the network element 24.

The network element 24 also prompts the caller to speak his/her name. The name spoken by the caller is recorded by the network element 24 as a audio file or data object.

The network element 24 determines from the caller's service request that the telephone call should be transferred to the first call center 16, which handles billing problems.

The network element 24 transfers the telephone call to the first call center 16 using standard technology. The ANI is transferred to the first call center 16 along, with the telephone call.

The network element 24 sends to the CRS 26 a message containing the call information that was collected, including the ANI and the audio file of the caller's spoken name. The network element 24 then discards the call information. The ACD 36 of the first call center 16 receives the telephone call from the network element 24. The ACD 36 distributes the telephone call to an agent workstation 42.

The agent workstation 42 is equipped with a web browser and customized call center software applications that are used to service customer calls. The agent uses the agent workstation 42 and the web browser to query the web server 76 of the CRS 26 for any existing information collected for the telephone call. The ANI of the telephone call is sent with the query as a call identifier.

The web server 76 of the CRS 26 receives the query and forwards it to the ISA 71.

The ISA queries the CRS database 70 using the ANI as a key. The ISA 74 locates the call information using the ANI, formats the call information into an HTML page, and provides the HTML page to the web server 76. The HTML page includes the audio file of the caller's name.

The web server 76 sends to the agent workstation 42 the HTML page received from the ISA 74.

The agent workstation 42 receives the HTML page including the audio file. The agent workstation 42 displays the HTML page using its web browser and plays the audio file so that the agent knows the caller's name. The agent greets the caller with the caller's name and can immediately begin servicing the caller without having to collect the same call information that the caller provided to the network element 24.

Call Flow 2

A caller calls a 1-800 number that places the telephone call to the first call center 16.

The ACD 36 of the first call center 16 receives the telephone call and an ANI for the calling telephone 14. The ACD 36 distributes the telephone call to the agent telephone 38 and distributes the ANI to the agent workstation 42.

An agent uses the agent telephone 38 and the agent workstation 42 to service the caller. The agent collects call information from the caller and enters the call information into the customer database 46 using the agent workstation 42.

While servicing the caller, the agent determines that the caller should be serviced at the second call center 18. For example, the caller may request a new service and the second call center 18 may be for new service orders while the first call center 16 is only for billing questions.

The agent causes the ACD 36 to transfer the call to the second call center 18. The agent also sends a message to the CRS 26 using the web browser of the agent workstation 42. The message may include the ANI for the caller and a pointer that indicates that the call information for the telephone call is stored in the customer database 46.

The ACD 48 of the second call center 18 receives the transferred telephone call from the first call center 16 via the local exchange switch 22. The ACD 48 transmits to the CRS 26 a query for any existing call information for the telephone call. The query includes the ANI for the telephone call.

The ISA 74 of the CRS 26 receives the query via the CRS modem 62. The ISA 74 uses the ANI received in the query to search for call information in the CRS database 70. The ISA 74 discovers in the CRS database 70 a record that includes the pointer to the call information that is stored in the customer database 46 of the first call center 16. The ISA uses the pointer to retrieve the appropriate call information from the customer database 46. The ISA 74 formats the call information and sends the call information to the ACD 48 of the second call center 18 as a response to the query from the ACD 48.

The ACD 48 of the second call center 18 distributes the telephone call to the agent telephone 50 and provides the associated call information to the agent workstation 54. The agent can immediately begin servicing the caller using the agent telephone 50 and agent workstation 54 without needing to collect the same caller information that was provided to the first call center 16.

Based on the foregoing discussion, it will be appreciated that the embodiments of the present invention discussed herein enable telephone calls and associated call information to be transferred among a plurality of distributed network elements and call centers. The CRS of the embodiment provides a source of call information that is centralized among multiple network elements and call centers. A CRS can provide an open interface, such as a web server, to each network element and call center to enable collection, storage, and retrieval of call information for virtually any platform, hardware, operating system, etc. The CRS eliminates the need for IVR platforms and other network elements to store information on a telephone call after the telephone call has been transferred. The CRS can transfer non-traditional information on calls, such as an audio file of a caller's recorded voice so that a call center agent can greet the caller by name.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary telecommunications systems described above. While certain operations under the present invention have been described as occurring generally in a serial fashion, those skilled in the relevant art will recognize that it is entirely within the scope of the invention to conduct some operations more or less simultaneously, or even in reverse order, from that described herein.

These and other changes can be made to the invention in light of the above detailed description. In general, in the following claims, the terms used should not be construed to limit the invention to the specific embodiments disclosed in the specification and the claims. Accordingly, the invention is not limited by the disclosure, but instead its scope is to be determined entirely by the following claims.

We claim:

1. A method of responding to a telephone call from a caller using first and second call receiving devices in a telecommunications network, the method comprising: receiving the telephone call at the first call receiving device;

obtaining caller information for the caller using the first call receiving device; transferring the telephone call to the second call receiving device;

transmitting the caller information from the first call receiving device to a call recognition service;

transmitting the caller information from the call recognition service to the second call receiving device in response to receiving a request for the caller information from the second call receiving device;

storing the caller information in a storage device of the first call receiving device;

transmitting from the first call receiving device to the call recognition service a pointer that references the caller information within the storage device of the first call receiving device;

transmitting the pointer from the call recognition service to the first call receiving device in response to receiving from the second call receiving device the request for caller information; and accessing the caller information from the storage device using the pointer and performing the steps of transmitting the caller information to the call recognition service and to the second call receiving device after accessing the caller information from the storage device.

2. The method of claim 1, further comprising:

storing the caller information in a storage device of the call recognition service; and in response to receiving from the second call receiving device the request for the caller information, accessing the caller information from the storage device before transmitting the caller information from the call recognition service to the second call receiving device.

3. The method of claim 1, further comprising:

assigning a call identifier to the telephone call;

transmitting the call identifier with the telephone call to the second call receiving device;

transmitting the call identifier with the caller information to the call recognition service; and in response to receiving from the second call receiving device the call identifier with the request for the caller information, retrieving the caller information using the call identifier and transmitting the retrieved caller information to the second call receiving device.

4. A method of responding to a telephone call from a caller using first and second call receiving devices in a telecommunications network, the method comprising:

obtaining caller information for the caller using the first call receiving device in response to receiving the telephone call;

transferring the telephone call to the second call receiving device;

storing the caller information in a storage device of the first call receiving device;

transmitting from the first call receiving device to the call recognition service a pointer that references the caller information within the storage device of the first call receiving device; and in response to receiving from the second call receiving device a request for information regarding the telephone call, transmitting the pointer from the call recognition service to the first call receiving device, wherein the step of transmitting the caller information from the first call receiving device to the second call receiving device includes transmitting the caller information from the first call receiving device to the call recognition service in response to receiving the pointer from the call recognition service and transmitting the caller information from the call recognition service to the second call receiving device.

5. The method of claim 4, further comprising:

storing the caller information in a storage device of the call recognition service; and in response to receiving from the second call receiving device a request for information regarding the telephone call, accessing the caller information from the storage device and transmitting the caller information from the call recognition service to the second call receiving device.

6. The method of claim 4, further comprising:

assigning a call identifier to the telephone call;

transmitting the call identifier with the telephone call to the second call receiving device;

transmitting the call identifier with the caller information to the call recognition service; and in response to receiving from the second call receiving device a request for information regarding the telephone call, the request for information including the call identifier, retrieving the caller information using the call identifier and transmitting the retrieved caller information to the second call receiving device.

7. A telecommunications system for efficiently transferring telephone calls, comprising:

a telecommunications network having first and second telecommunications interfaces of respective first and second call receiving devices connected to each other by a telecommunications line, the first telecommunications interface being structured to receive a telephone call from a caller and transfer the telephone call to the second telecommunications interface via the telecommunications line; and a data network including a call recognition service structured to receive the caller information from the first call receiving device and transmit the caller information to the second call receiving device and having first and second data interfaces of the first and second call receiving devices, respectively, connected to each other by a data line, the first data interface being structured to obtain caller information for the caller and transmit the caller information to the second data interface via the data line.

8. The telecommunications system of claim 7 wherein the first call receiving device includes a storage device that stores the caller information, the first data interface is structured to transmit to the call recognition service a pointer that references the caller information within the storage device of the first call receiving device, and the call recognition service includes an interactive service agent structured to receive the pointer, and in response to receiving a request from the second call receiving device, use the pointer to access the caller information in the storage device of the first call receiving device and transmit the caller information to the second call receiving device.

9. A call recognition service in a telecommunications system having a first call receiving device and a second call receiving device, the first call receiving device being structured to receive a telephone call from a caller, obtain call information and transfer the telephone call to the second call receiving device, the call recognition service comprising:

a data interface structured to receive the call information from the first call receiving device, the first call receiving device including a storage device that stores the call information;

a processor for executing computer instructions to implement programmed functions;

a memory storing executable computer instructions that cause the processor to transmit the call information via the data interface to the second call receiving device in response to receiving an indication that the telephone call has been transferred to the second call receiving device; and a secondary storage device that stores a pointer received from the first call receiving device, the pointer referencing the call information stored in the storage device of the first call receiving device, wherein the memory includes computer instructions that cause the processor to read the pointer from the secondary storage device and use the pointer to retrieve the call information from the first call receiving device before transmitting the call information to the second call receiving device.

* * * * *